United States Patent
Rico et al.

(10) Patent No.: US 8,664,809 B2
(45) Date of Patent: Mar. 4, 2014

(54) APPARATUS TO SUPPORT SUPERCONDUCTING WINDINGS IN A ROTOR OF AN ELECTROMOTIVE MACHINE

(75) Inventors: Raul R. Rico, Oviedo, FL (US); Robert L. Murphy, Longwood, FL (US)

(73) Assignee: Siemens Energy, Inc., Orlando, FL (US)

( * ) Notice: Subject to any disclaimer, the term of this patent is extended or adjusted under 35 U.S.C. 154(b) by 185 days.

(21) Appl. No.: 13/418,624

(22) Filed: Mar. 13, 2012

(65) Prior Publication Data
US 2012/0235532 A1 Sep. 20, 2012

Related U.S. Application Data

(60) Provisional application No. 61/452,726, filed on Mar. 15, 2011.

(51) Int. Cl.
*H02K 9/00* (2006.01)
(52) U.S. Cl.
USPC ............................................. 310/52; 310/194
(58) Field of Classification Search
USPC .................... 310/52, 194, 260, 261.1, 262
See application file for complete search history.

(56) References Cited

U.S. PATENT DOCUMENTS

| | | | |
|---|---|---|---|
| 4,385,248 A * | 5/1983 | Laskaris | 310/52 |
| 7,633,192 B2 | 12/2009 | Zhang et al. | |
| 7,795,764 B2 | 9/2010 | Frank et al. | |
| 7,825,551 B2 | 11/2010 | Zhang et al. | |
| 2002/0171303 A1 | 11/2002 | Laskaris et al. | |
| 2002/0171304 A1 | 11/2002 | Laskaris et al. | |
| 2002/0171318 A1 | 11/2002 | Wang et al. | |
| 2002/0171325 A1 | 11/2002 | Wang et al. | |
| 2002/0190586 A1 | 12/2002 | Laskaris et al. | |
| 2003/0102770 A1 | 6/2003 | Laskaris | |
| 2003/0173862 A1 | 9/2003 | Wang et al. | |
| 2008/0061637 A1* | 3/2008 | Gamble et al. | 310/52 |
| 2008/0079323 A1* | 4/2008 | Zhang et al. | 310/52 |

* cited by examiner

Primary Examiner — Nguyen N Hanh

(57) ABSTRACT

An apparatus (structure) is provided to support a superconductor winding (61) of an electromotive machine. An elongated loop (74) provides radial support to the winding. A base assembly (84) may include a base module (89) arranged to anchor the loop at a proximate end (76) of the elongated loop by way of a tubular coupling (86). The tubular coupling may further provide a mechanical connection relative to an axially-adjacent base module. A bracket assembly (100) may define an interior recess to receive a portion of the winding and to support the elongated loop at a distal end (78) of the elongated loop, such as by way of a support (80). A lateral-extending loop (106) may have a first end connected to the bracket assembly (100) and a second end connected to the base module (89) to transfer to the rotor core lateral loads, which may be experienced by the winding.

28 Claims, 8 Drawing Sheets

APPARATUS TO SUPPORT SUPERCONDUCTING WINDINGS IN A ROTOR OF AN ELECTROMOTIVE MACHINE

This application claims benefit of the Mar. 15, 2011 filing date of U.S. patent application 61/452,726, which is incorporated by reference herein in its entirety.

FIELD OF INVENTION

The invention relates generally to electromotive machines, such as electric generators, motors, and, more particularly, to apparatus (e.g., mechanical structures) arranged to support and thermally isolate superconducting rotor windings in a rotor of the machine.

BACKGROUND OF THE INVENTION

To increase output and efficiency and reduce machine size and weight, superconducting rotor windings with virtually no electrical resistance have been developed. These winding are commonly referred to as high-temperature superconducting (HTS) windings (distinguished from low temperature superconducting materials that achieve a superconducting state at a lower temperature). It is preferred to use high-temperature superconducting materials since their cooling requirements are less severe.

Although the HTS rotor windings (coils) exhibit a relatively low resistance to electrical current flow, they are sensitive to mechanical bending and tensile stresses that can cause premature degradation and winding failure (e.g., an electrically open circuit). For example, it is necessary to form bends in the HTS rotor windings that circumscribe the core. Stresses are induced at these bends. Normal rotor torque, transient fault condition torques and transient magnetic fields induce additional stress forces in the rotor windings. Also, the HTS rotor winding may be subjected to over-speed forces during rotor balancing procedures at ambient temperature and occasional over-speed conditions at superconducting temperatures during power generation operation. These over-speed and fault conditions substantially increase the centrifugal force loads on the rotor windings beyond the loads experienced during normal operating conditions. These operating conditions must be considered in the design of the HTS rotor windings and associated support structures.

To maintain the superconducting conductors at or below their critical temperature, coolant flow paths carrying coolant supplied from a cryogenic cooler are disposed adjacent or proximate the windings. Typical coolants may comprise liquid helium, liquid nitrogen or liquid neon. Maintaining the structural integrity of the superconducting rotor windings and associated support structure against static and dynamic loads presents a substantial challenge to the development of a high temperature superconducting electromotive machine.

In view of the foregoing considerations, it is desirable the HTS rotor windings be adequately supported by a winding support system designed to withstand the forces, stresses, strains and cyclical loads of normal and fault condition operation described above. Moreover, the support system should ensure that the windings do not prematurely crack, fatigue or break. It is further desirable that the winding support structure appropriately insulate the "warm" rotor (typically operating at room temperature) from the cryogenically-cooled HTS superconducting windings to maintain the windings at or below their critical temperature.

BRIEF DESCRIPTION OF THE DRAWINGS

The invention is explained in the following description in view of the drawings that show.

DETAILED DESCRIPTION OF THE INVENTION

Figure 1:
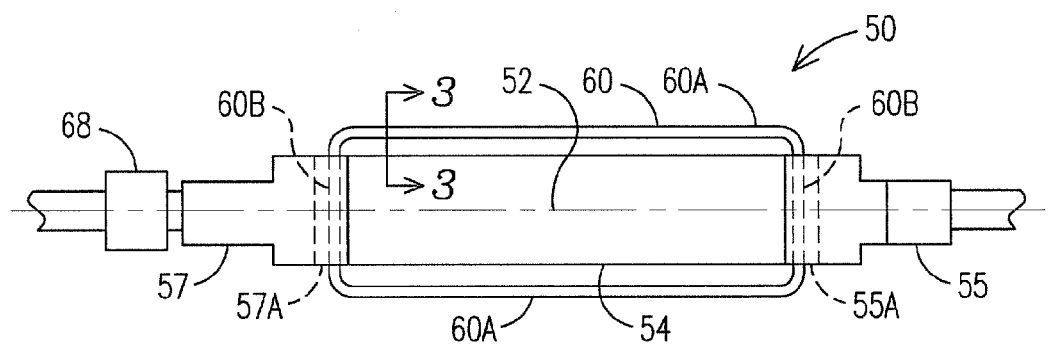
FIG. 1 is a schematic representation of an example rotor, as may be used in a superconducting electromotive machine embodying aspects of the present invention.

A superconducting rotor 50 embodying aspects of the invention is shown in FIG. 1. The superconducting rotor 50 defines a longitudinally-extending axis 52 (e.g., axial direction) and comprises a generally cylindrically-shaped core 54 and coaxially aligned rotor end sections 55 and 57 each attached to an end surface of the core 54. A material of the core 54 exhibits a high magnetic permeability, e.g. a ferromagnetic material such as iron.

The superconducting rotor 50 may further comprise a generally longitudinally-extending, racetrack-shaped superconducting coil or winding 60 comprising generally linear axially-extending winding segments 60A connected by radially-extending winding segments 60B (e.g., radial direction), as may extend through respective spacers 55A and 57A disposed at the respective end sections 55 and 57 of rotor 50.

In one example embodiment, superconducting rotor 50 may be arranged as a rotor of an electric generator and superconducting winding 60 may be arranged as an electric generator field (rotor) winding. One of the end sections 55 or 57 may include a turbine coupling for connecting rotor 50 to a prime mover for supplying rotational energy to the superconducting rotor 50 for generating electricity in a stator. In another embodiment, superconducting rotor 50 may be arranged as a rotor of a motor for producing rotational energy responsive to an electric field generated in a surrounding stator winding.

In one example embodiment, end section 57 may include a cryogenic transfer coupling 68. When superconducting rotor 50 is rotating during operation of the dynamoelectric machine, cryogenic transfer coupling 68, which may comprise a stationary portion and a rotating portion (the individual portions not illustrated in FIG. 1), supplies cooling fluid (e.g., cryogenic fluid) from a cryogenic cooler (not shown) to closed coolant flow paths or channels in the superconducting winding 60 to maintain the superconducting winding 60 at or below its critical temperature. The coolant flows through the coolant channels, circulates back to the cryogenic cooler where the coolant temperature is reduced and returns to the coolant channels.

The required cooling capacity of the cryogenic cooler is directly related to the heat transferred from the "warm" rotor core 54 to the superconducting winding 60 during operation of the superconducting generator. The inventors of the present invention propose a winding support structure arranged to substantially reduce such heat transfer during normal and transient operational conditions so that, for example, one can reduce the required cooler capacity and the energy consumed by the cooler to cool the cryogenic fluid.

Figure 2:
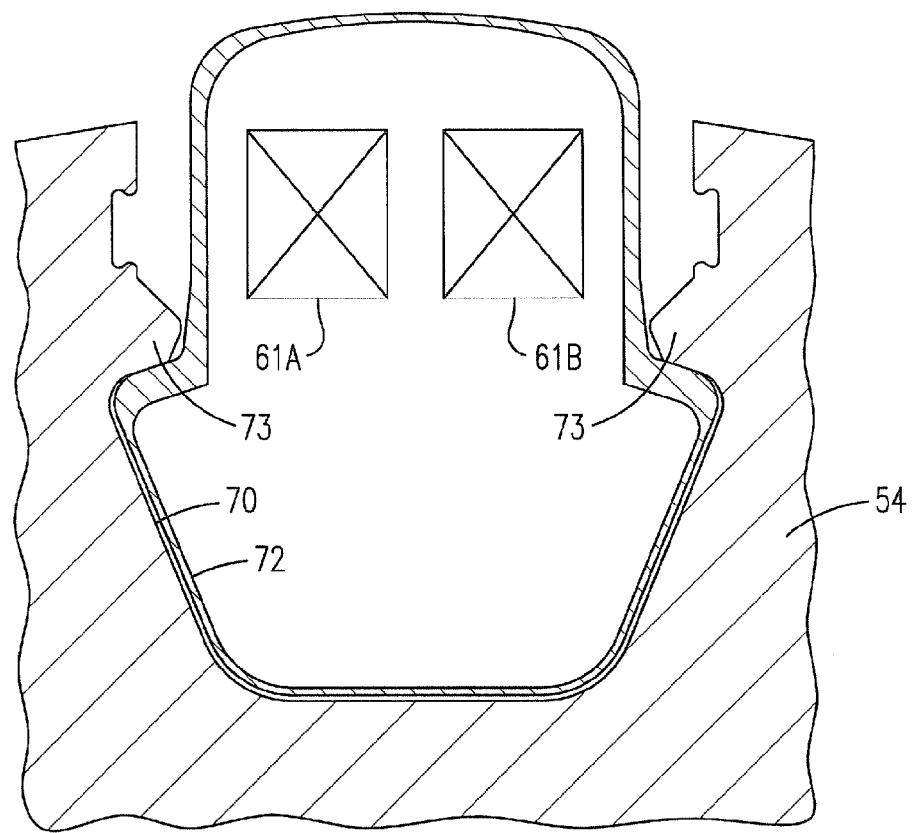
FIGS. 2-4 are respective cross-sectional views along a plane 3-3 of FIG. 1.
Figure 3:
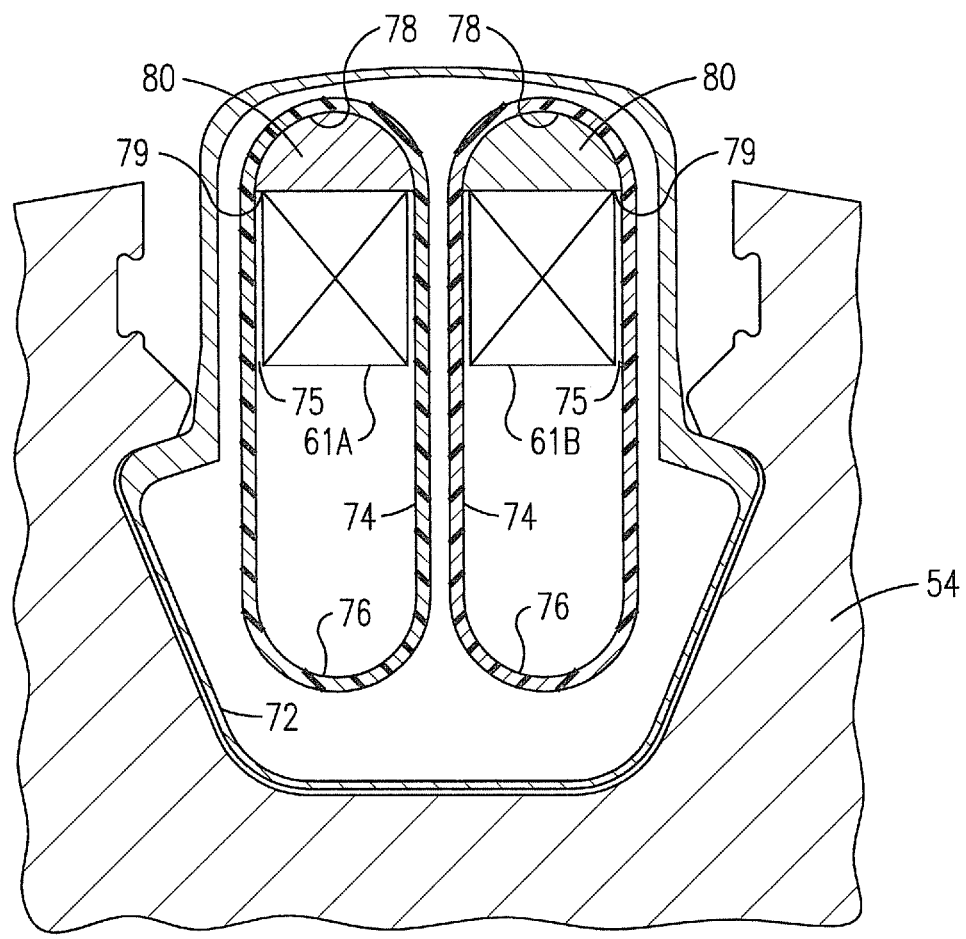
Figure 4:
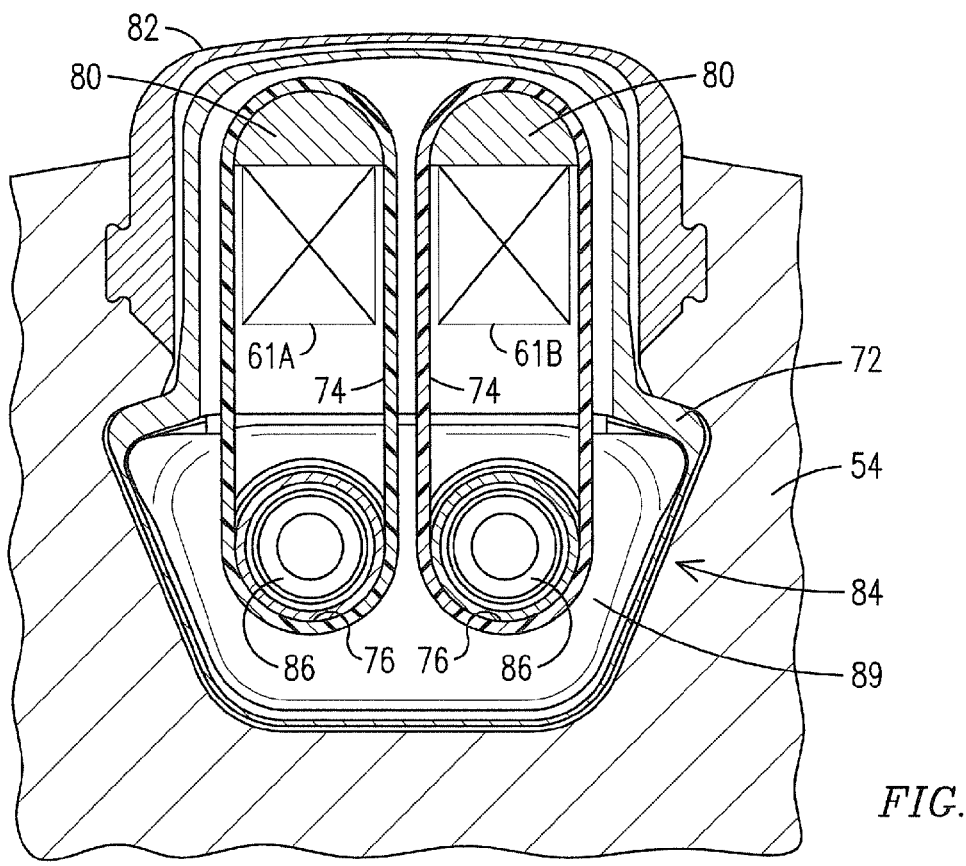

FIGS. 2-4 are respective cross-sectional views along a plane 3-3 of FIG. 1. Because of the various components involved, these figures will be used for gradually introducing components of an example embodiment of a winding support apparatus embodying aspects of the present invention. The idea is to gradually introduce components that form the winding support apparatus to avoid overwhelming the reader.

FIG. 2 illustrates a cavity 70, as may be constructed in rotor core 54. Cavity 70 may be configured to receive a cryostat 72, as may be used to provide a vacuum to limit radiative heat transfer from rotor core 54 to superconducting blocks (e.g., windings) 61A and 61B, which in this example embodiment make up superconducting winding 60. In one example embodiment cryostat 72 may be made from a non-magnetic metal or metal alloy, such as non-magnetic steel.

Cavity 70 may be configured to define appropriately shaped restraining structures, such as shoulders 73, (e.g., protuberances) configured to engage a corresponding surface of cryostat 72 to retain cryostat 72 in cavity 70 under centrifugal forces that develop during rotor operation. Although two superconducting blocks are illustrated in the FIGs, it will be appreciated that aspects of the present invention are not limited to any specific number of superconducting blocks since other example embodiments may have more or fewer than two superconducting blocks.

Each of superconducting windings 61A and 61B is made up of a plurality of superconducting tapes formed from a known superconducting HTS material. As would be understood by those skilled in the art, suitable adhesives and techniques may be used to assemble and retain the tapes in a desired configuration. The description below proceeds to introduce example components for mechanically supporting superconducting windings 61A and 61B while substantially reducing heat transfer to superconducting windings 61A and 61B from the "warm" rotor core 54.

FIG. 3 illustrates a pair of elongated loops 74, as may be formed from a material having a relatively high tensile strength at low-temperatures and having high thermal resistivity (i.e., a low thermal conductivity), such as a fiber-reinforced plastic (FRP) material. By way of example and not of limitation, certain example FRP materials may exhibit a tensile strength of approximately 1000 Mpa or more and a thermal conductivity of approximately 0.37 W/mK (Watts per meter length-temperature degree Kelvin) or less at 77° K (compared to stainless steel, which may exhibit a thermal conductivity of approximately 0.65 W/mK or more). Accordingly, FRP material is one example of a material substantially resistant to heat flow.

Each loop 74 extends from a proximate end 76 to a distal end 78 to provide radial support to superconducting windings 61A and 61B. In this example, distal end 78 constitutes a radially distal end relative to rotor axis 54 (FIG. 1). The FRP material of loops 74 substantially resists heat flow from the warm rotor core 54 to superconducting windings 61A and 61B. A gap 75 (e.g., radially-extending gap) may be provided between each loop 74 and a corresponding lateral surface of superconducting windings 61A and 61B to reduce conductive thermal coupling between loops 74 and superconducting windings 61A and 61B. Contact may be provided between loops 74 and superconducting windings 61A and 61B at a distal edge 79 (e.g., upper lateral edge) of superconducting windings 61A and 61B.

As should be appreciated from the description that follows, each loop 74 may be arranged to effectively transfer centrifugal loads exerted on superconducting windings 61A and 61B to the rotor core 54. FIG. 3 further shows an example embodiment of a pair of supports 80 (e.g., arch-shaped supports) each respectively disposed between a respective distal end 78 of loops 74 and a corresponding surface (e.g., top surface) of superconducting windings 61A and 61B. Arch-shaped supports 80 may be made from an aluminum alloy, copper or other suitable relatively light-weight, non-magnetic material. The description below proceeds to introduce further components for mechanically supporting superconducting windings 61A and 61B while substantially reducing heat transfer to superconducting windings 61A and 61B from the "warm" rotor core 54.

FIG. 4 shows a base assembly 84 comprising a plurality of base modules 89 (e.g., FIGS. 6-8) configured to anchor with respect to the rotor core each loop 74 at its respective proximate end 76. In one example embodiment, base modules 89 may be arranged to form an axially-extending anchoring beam, and such modules may be conceptually analogized to Lego-like interlocking building blocks. It will be appreciated that the modular aspects of base assembly 84 are conducive to facilitate the routing of the axially-extending winding segments 60A (FIG. 1) of superconducting windings 61A and 61B.

Base assembly 84 may be made from steel and may be configured to be enclosed by cryostat 72, where base assembly 84 is retained by shoulders 73 (FIG. 2) together with cryostat 72 in cavity 70 under centrifugal forces that develop during rotor operation. In one example embodiment, cryostat 72 may in part be configured to enclose base assembly 84 and may be further configured to extend outside cavity 70 to form a vacuum about the winding support apparatus and the superconductor windings.

In one example embodiment, base assembly 84 may include a tubular coupling 86 configured to receive a respective proximate end 76 of each loop 74 and to provide a mechanical connection (e.g., axial connection) to an adjacent base module. FIG. 4 further illustrates an electromagnetic shield 82, which may be connected to rotor 54 to shield superconducting windings 61A and 61B from transient electromagnetic fields. Shield 82 may be made from an electrically conductive and non-magnetic material, such as aluminum or copper.

Figure 5:
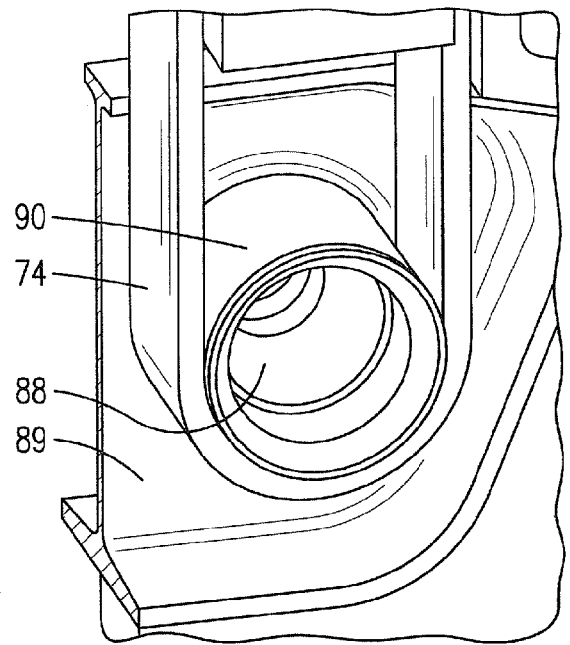
FIG. 5 is a fragmentary isometric view of an example base module, which in combination with additional base modules may be arranged to form an axially-extending anchoring beam, which in one example embodiment may be interconnected by way of a segmented tubular coupling arrangement.

FIG. 5 is a fragmentary isometric view of an example base module 89, which in combination with additional base modules, may form base assembly 84 (FIG. 4). In one example embodiment, each base module 89 may include a male coupler 88 configured to receive at least a portion of a female coupler 90, which over a portion of its outer diameter receives the proximate end of a corresponding loop 74. The axial dimension of female coupler 90 may be sufficiently long relative to the axial dimension of male coupler 88 so that female coupler can also be received by a male coupler of an axially adjacent base module.

Figure 6:
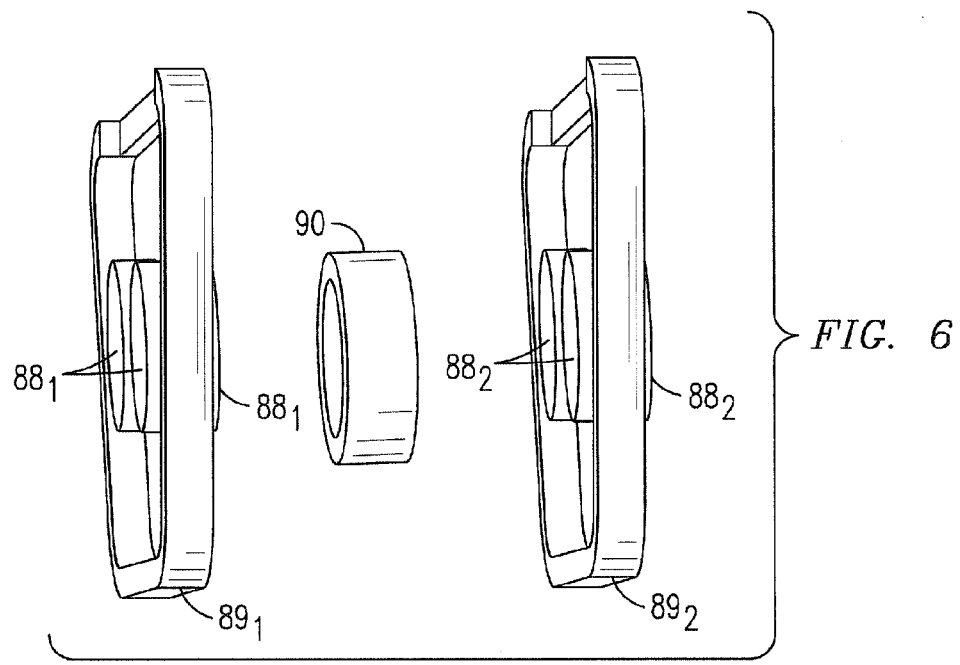
FIG. 6 is a fragmentary exploded view of two base modules, as may be axially interconnected to one another by way of tubular couplers.

FIG. 6 is a fragmentary exploded view of two base modules $89_1$ and $89_2$ each having respective male couplers $88_1$ and $88_2$ as may be axially interconnected to one another by way of respective female couplers 90. For simplicity of illustration just one female coupler 90 is shown in FIG. 6. An additional female coupler 90 would be used to interconnect the remaining male couplers of base modules $89_1$ and $89_2$.

Figure 7:
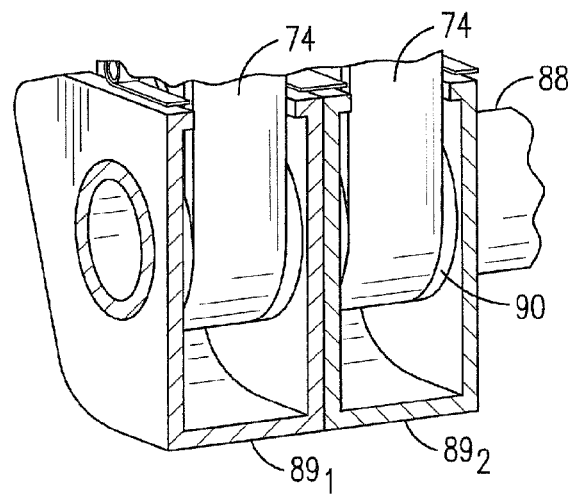
FIG. 7 is a fragmentary cut-away view illustrating an example axial assembly of two interconnected base modules including respective loops arranged to provide radial support.
Figure 8:
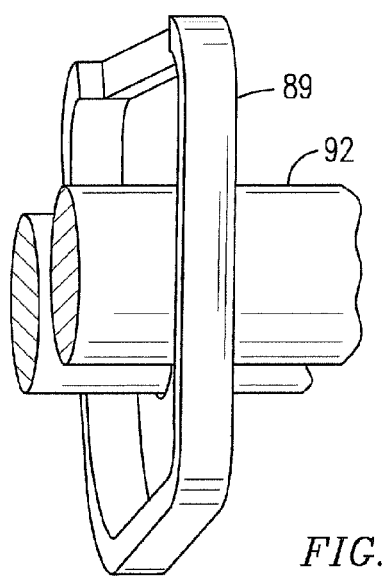
FIG. 8 is an isometric view of continuous rods, as may be used for anchoring each loop at its respective proximate end, in lieu of the foregoing segmented coupling arrangement.

FIG. 7 is a fragmentary cut-away view illustrating an axial assembly of two example base modules $89_1$ and $89_2$ including respective elongated loops 74. It will be appreciated that the tubular coupling described in the context of FIGS. 3-7 is an example of a segmented tubular coupling arrangement. It will be understood that aspects of the present invention are not limited to a segmented tubular coupling arrangement. For example, one could use a continuous tubular coupling arrangement. For example, as shown in FIG. 8, one or more continuous rods 92 may be used for anchoring each loop 74 at its respective proximate end 76 in lieu of the foregoing segmented coupling arrangement.

Figure 9:
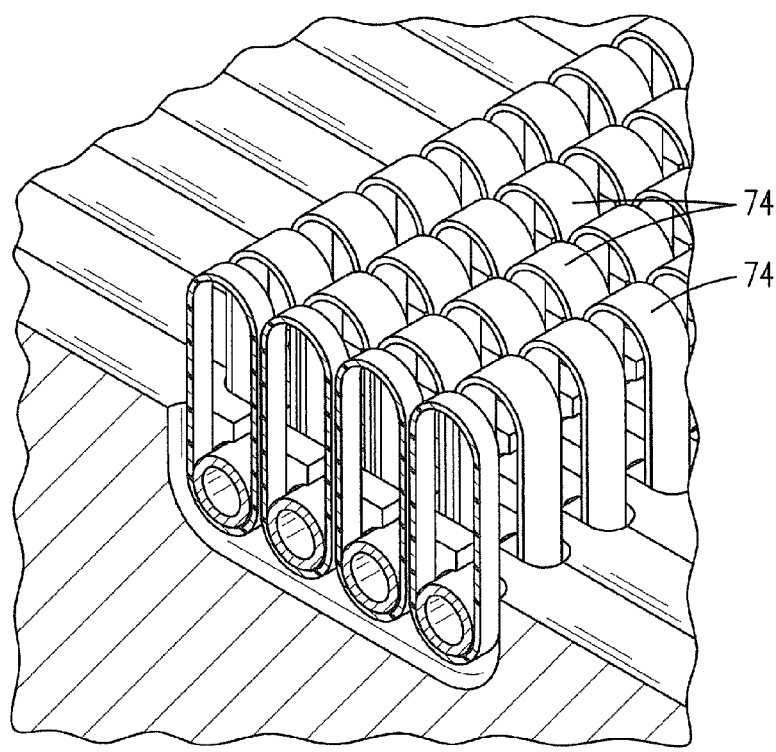
FIGS. 9 and 10 illustrate respective isometric views of an example embodiment of a base assembly where the loop-anchoring structures are integral with the rotor core of the machine.
Figure 10:
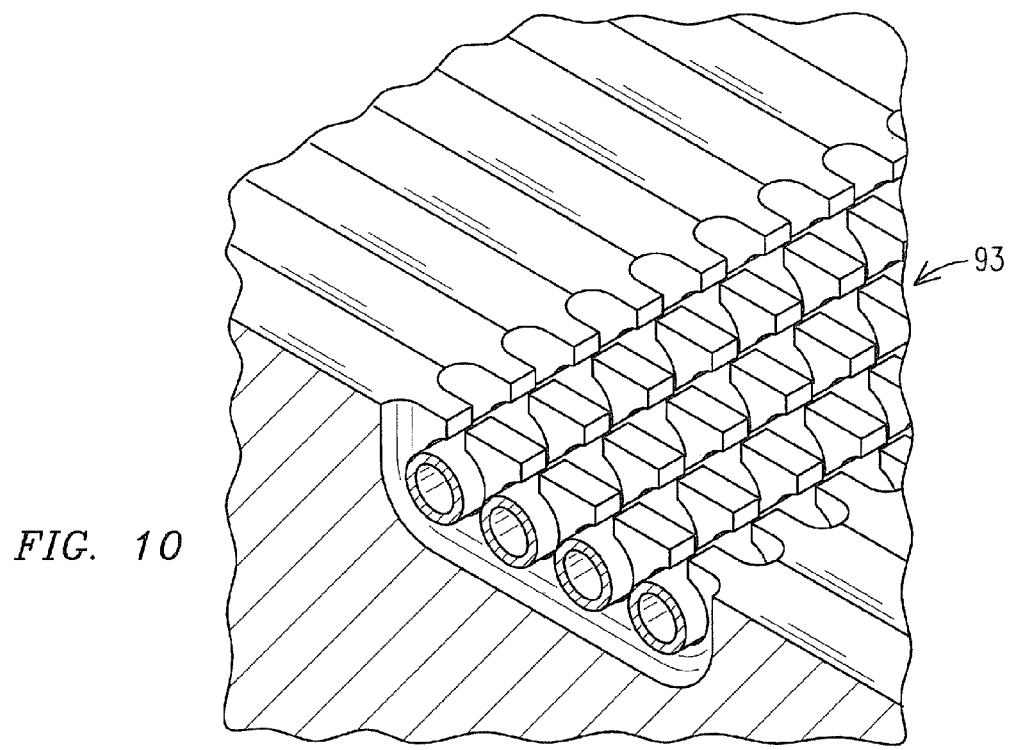

It will be appreciated that aspects of the present invention are not limited to a base assembly structure 84 disposed in a cryostat in a rotor cavity. For example, it is contemplated that, in lieu of base assembly 84 (and associated tubular coupling structures) accommodated in a rotor cavity, one could construct anchoring structures 93 for loops 74, where such anchoring structures are integral with the rotor core of the machine, as shown in FIGS. 9 and 10. In this example embodiment, the cryostat may be externally disposed relative to the rotor core, which is a cylindrical structure, and may be attached to and arranged to surround the rotor core 54 to form the vacuum about the winding support apparatus and the superconductor windings.

Figure 11:
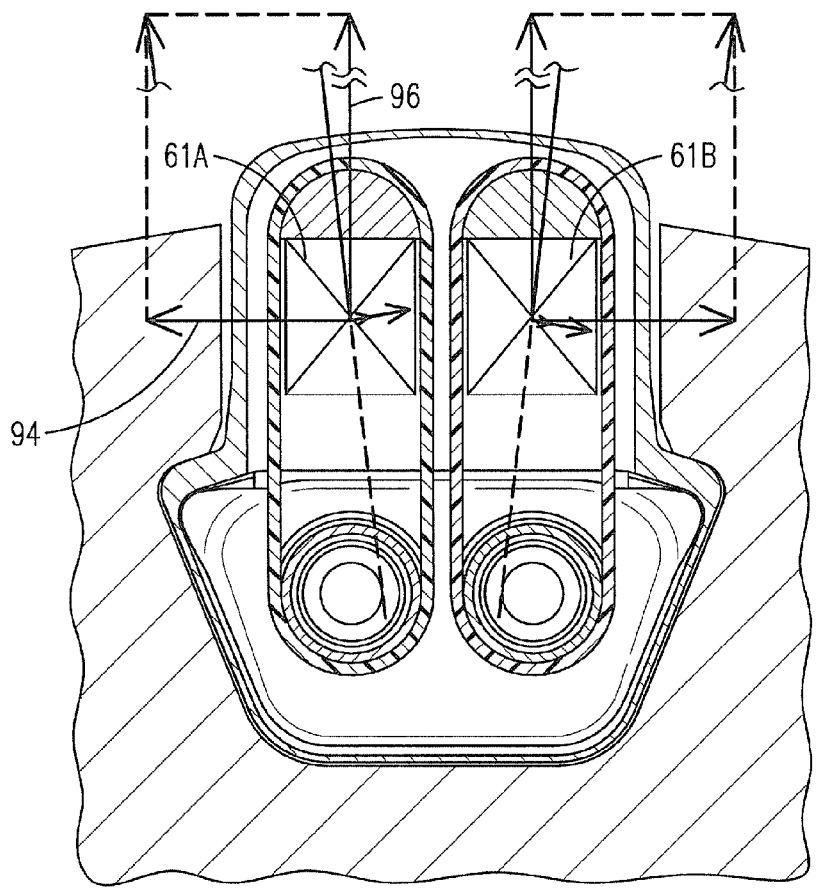
FIG. 11 is a diagram that may be helpful to visualize centrifugal forces, which may generate both a tangential load component (e.g., lateral component) and a radial load component, which, for example during rotor operation, may be experienced by the superconducting blocks (e.g., windings) of the machine.

FIG. 11 is used to visually appreciate that the positioning of superconducting windings 61A and 61B may not be coincidental with a radial direction. Therefore, during rotor operation, the centrifugal forces can generate both a tangential load component 94 (e.g., lateral component) and a radial load component 96, which will be experienced by superconducting windings 61A and 61B. The description below proceeds to introduce components used for mechanically supporting superconducting windings 61A and 61B in view of the presence of such tangential and radial load components.

Figure 12:
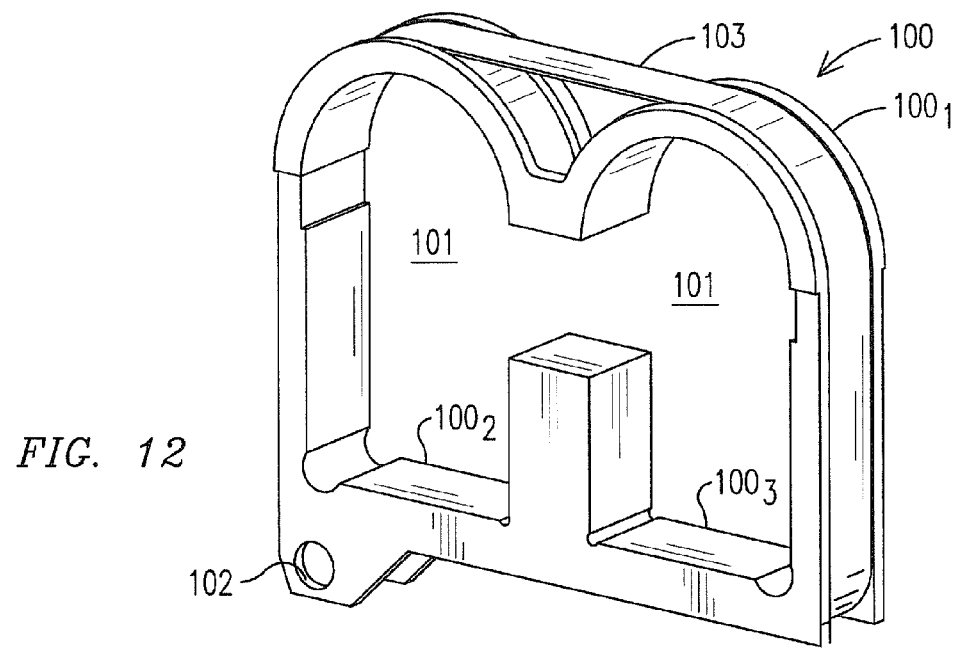
FIG. 12 is an isometric view of a bracket assembly that defines respective interior recesses configured to receive at least a portion of laterally-adjacent superconducting windings.
Figure 13:
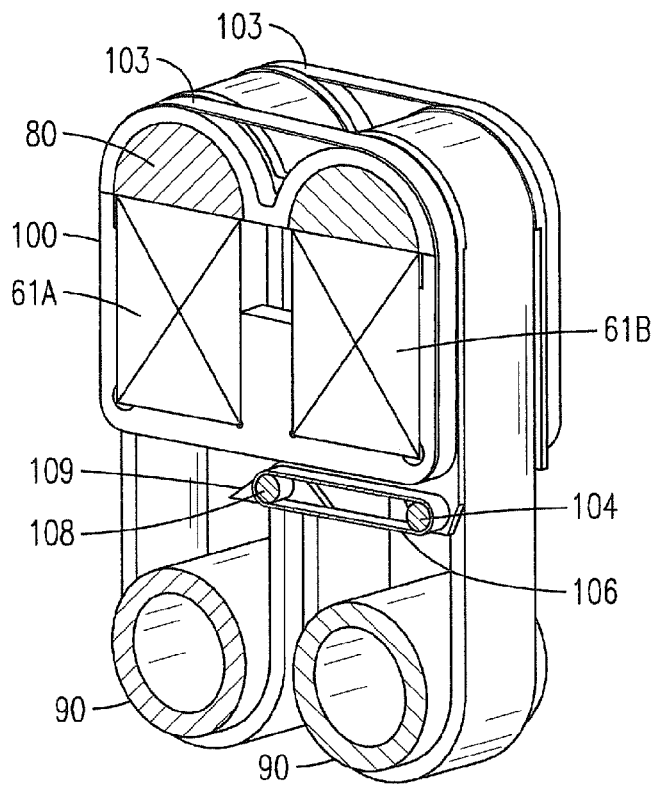
FIG. 13 is an isometric view of the bracket assembly of FIG. 12, showing the superconducting windings and respective arch-shaped supports. The bracket assembly may be arranged to support one end of a laterally-extending loop arranged to transfer lateral loads, which may be experienced by the superconducting windings.

FIG. 12 is an isometric view of a bracket assembly 100 that defines respective interior recesses 101 configured to receive at least a portion of superconducting windings 61A and 61B (e.g., laterally-adjacent windings) and respective arch-shaped supports 80, as illustrated in FIG. 13. In one example embodiment, bracket assembly 100 may be made up of three subassemblies, such as bracket subassemblies $100_1$, $100_2$, and $100_3$.

In this example embodiment, subassembly $100_1$ may be shaped as an inverted number "3" structure, and subassemblies $100_2$, and $100_3$ may be shaped as mutually facing "L" shaped structures. Respective portions of the periphery of subassemblies $100_1$, $100_2$, and $100_3$ may be strapped by a strap 103, such as may be made of titanium or other metal of high-tensile strength. In one example embodiment, strap 103 may be effectively arranged to keep subassemblies $100_1$, $100_2$, and $100_3$ tightly interconnected to one another and prevent separation of such subassemblies (e.g., opening separation of subassemblies $100_2$, and $100_3$) under a tangential load.

Bracket subassemblies $100_2$ or $100_3$ may include respective openings 102 for receiving a first pin 104 (FIG. 13) arranged to support one end of a laterally-extending loop 106, which (like radial-support loop 74) may also be made of a material substantially resistant to heat flow (e.g., FRP material and the like). The other end of laterally-extending loop 106 may be supported by a second pin 108, as may be connected to a central portion 109 of a respective base module. That is, pin 108 in combination with portion 109 of the base assembly comprises an anchor point for transferring to rotor core 54 through laterally-extending loop 106 lateral loads experienced by superconducting windings 61A and 61B.

Figure 14:
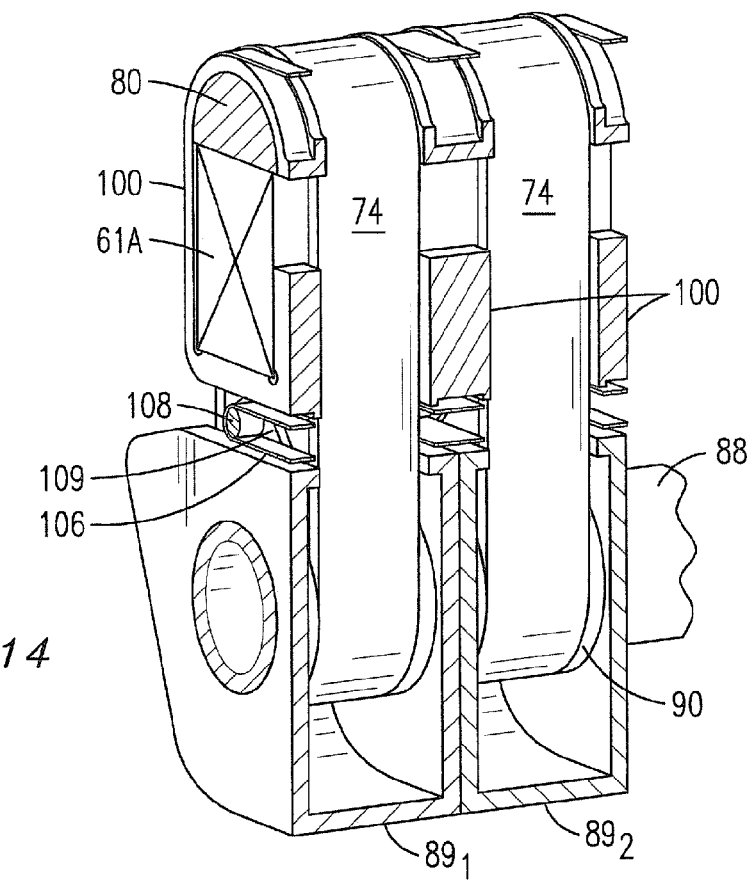
FIG. 14 is a fragmentary cut-away view illustrating an axial assembly of two example base modules including respective bracket assemblies that in combination make up a modular bracket assembly with respect to the axially-extending winding segments.

FIG. 14 is a fragmentary cut-away view illustrating an axial assembly of two example base modules $89_1$ and $89_2$ including respective bracket assemblies 100 that in combination make up a modular bracket assembly with respect to the axially-extending winding segments 60A (FIG. 1). As should be appreciated from FIG. 15, to provide symmetrical transfer to the lateral loads, in one example embodiment, the orientation of laterally-extending loops 106 may be alternated. For example, in FIG. 13, it can be appreciated that pin 104 is located relative to the right side of anchor pin 108, whereas in FIG. 15 it can be appreciated that pin 104 in the next axially-adjacent bracket assembly is located relative to the left side of anchor pin 108.

Figure 15:
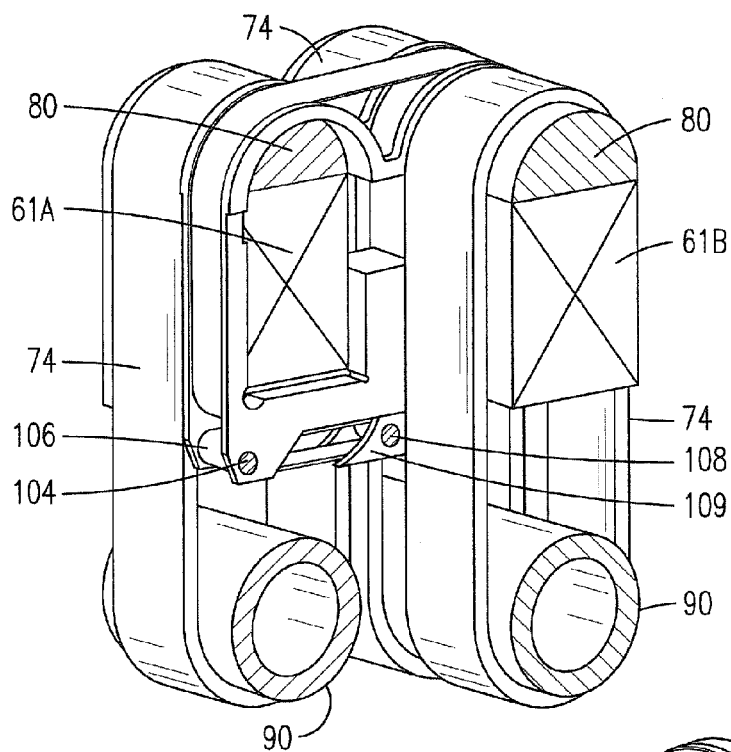
FIG. 15 is a fragmentary isometric view, which may be helpful to visualize that the orientation of the laterally-extending loops may be alternated to effect a symmetrical transfer to the lateral loads.

Accordingly, in one example embodiment, laterally-extending loops 106 may form an axial sequence of laterally-extending loops arranged to directionally alternate so that a first laterally-extending loop (e.g., lateral loop 106 in FIG. 13) in the sequence has its first end mechanically supported by a corresponding bracket assembly at a first lateral end (e.g., as shown in FIG. 13, loop 106 may be supported by pin 104, which in this example case is located relative to the right side of anchor pin 108) of the assembly. A second axially-adjacent laterally-extending loop (e.g., lateral loop 106 in FIG. 15) in the sequence may have its first end mechanically supported by a corresponding bracket assembly at a second lateral end of the assembly, (e.g., as shown in FIG. 15, loop 106 may be supported by pin 104, which in this case is located relative to the left side of anchor pin 108). In this example embodiment, the first and second ends of the corresponding assemblies may correspond to mutually opposite lateral ends, and thus the directionally alternating sequence of laterally-extending loops may be effectively arranged along the axial direction to symmetrically transfer a tangential load to the rotor core.

It will be appreciated that aspects of the present invention are not limited to a directionally alternating sequence of laterally-extending loops in order to symmetrically transfer a tangential load to the rotor core. For example, one may arrange laterally-adjacent (side-by-side) pairs of laterally-extending loops so that the respective first ends of such loops may be respectively connected to the mutually opposite lateral ends of a given bracket assembly and the respective second ends of such loops may be anchored (e.g., jointly anchored) to the central portion 109 of a respective base module.

It may be appreciated in FIG. 14 that bracket assembly 100 (e.g., the intermediate bracket assembly 100, which is shared by base modules $89_1$ and $89_2$) may be interposed between corresponding portions of respective pairs of axially-adjacent elongated loops 74.

Figure 16:
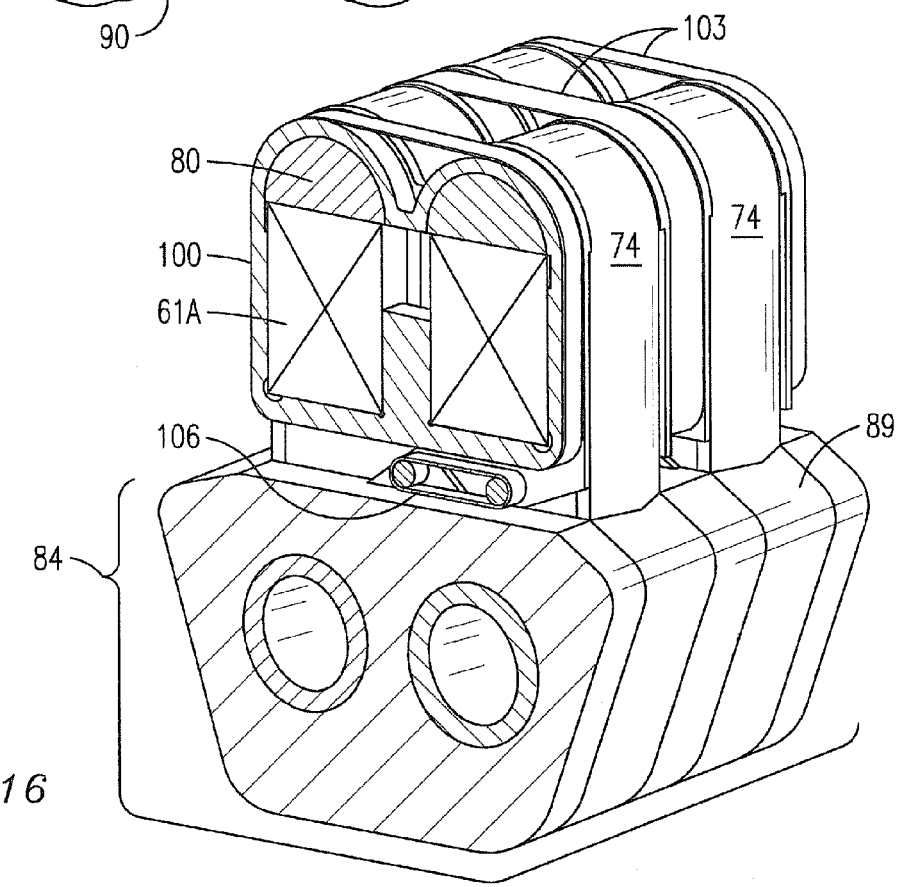
FIG. 16 is an isometric view illustrating an assembly of at least some of the various components illustrated in some of the preceding FIGs, which in combination form a winding support apparatus embodying aspects of the present invention, such as may be effective to substantially reduce heat transfer from the "warm" rotor core to the superconducting windings while mechanically withstanding forces, stresses, strains and cyclical loads that may develop during normal and/or fault conditions of the machine.

FIG. 16 is an isometric view illustrating an assembly of at least some of the various components described in the preceding description, which in combination form a winding support apparatus embodying aspects of the present invention, such as may be effective to substantially reduce heat transfer from the "warm" rotor core to the superconducting winding while mechanically withstanding forces, stresses, strains and cyclical loads that may develop during normal and/or fault conditions of the machine.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus to support at least one superconductor winding in a spaced-apart relationship from a rotor core of an electromotive machine, the apparatus comprising:
   at least one elongated loop arranged to provide radial support to said at least one superconducting winding, the elongated loop comprising a material substantially resistant to heat flow;
   an axially-extending base assembly arranged to anchor said at least one loop with respect to the rotor core at a proximate end of the elongated loop; and
   a bracket assembly configured to define an interior recess to receive at least a portion of said at least one superconductor winding and to support the elongated loop at a distal end of the elongated loop.

2. The apparatus of claim 1, wherein the axially-extending base assembly comprises a modular assembly comprising at least one base module disposed in a cavity of the rotor core.

3. The apparatus of claim 2, wherein said rotor core cavity is configured to define mutually opposite shoulders arranged to retain the base assembly in said cavity.

4. The apparatus of claim 3, further comprising a cryostat retained in said rotor core cavity by the mutually opposite shoulders and at least in part configured to enclose the base assembly and further configured to extend outside the cavity to form a vacuum about said at least one superconductor winding.

5. The apparatus of claim 2, wherein said at least one base module is arranged to anchor the proximate end of said at least one loop with respect to the rotor core by way of a tubular coupling.

6. The apparatus of claim 5, wherein the tubular coupling is further arranged to provide an axial mechanical connection with respect to an axially-adjacent base module.

7. The apparatus of claim 5, wherein the tubular coupling comprises a segmented tubular coupling interconnectable by way of respective couplers.

8. The apparatus of claim 5, wherein the tubular coupling is arranged as a continuous tubular coupling comprising at least one axially-extending continuous rod.

9. The apparatus of claim 1, further comprising a laterally-extending loop arranged to provide lateral support to said at least one superconducting winding, the laterally-extending loop comprising a material substantially resistant to heat flow.

10. The apparatus of claim 9, wherein said lateral laterally-extending loop has a first end mechanically supported by the bracket assembly and has a second end mechanically supported by the base assembly to provide an anchor support with respect to the rotor core.

11. The apparatus of claim 9, comprising an axial sequence of side-by-side pairs of laterally-extending loops arranged to symmetrically transfer a tangential load to the rotor core.

12. The apparatus of claim 9, comprising an axial sequence of laterally-extending loops, wherein the sequence of laterally-extending loops is arranged to directionally alternate so that a first laterally-extending loop in the sequence has its first end mechanically supported by a corresponding bracket assembly at a first lateral end of said assembly, and a second axially-adjacent laterally-extending loop in the sequence has its first end mechanically supported by a corresponding bracket assembly at a second lateral end of said assembly, wherein the first and second ends of the corresponding assemblies comprise mutually opposite lateral ends, thereby said directionally alternating sequence of laterally-extending loops being arranged to symmetrically transfer a tangential load to the rotor core.

13. The apparatus of claim 1, wherein the bracket assembly is interposed between corresponding portions of respective pairs of axially-adjacent elongated loops.

14. The apparatus of claim 1, wherein the bracket assembly comprise three subassemblies, wherein two of said three subassemblies are configured to receive respective portions of a respective pair of laterally-adjacent superconductor windings, and the third subassembly is arranged to support the respective distal ends of the elongated loops for the respective pair of laterally-adjacent superconductor windings by way of a pair of arch-shaped structures.

15. The apparatus of claim 14, further comprising a strap arranged about respective portions of an outer periphery of said three subassemblies to keep said subassemblies tightly interconnected to one another and prevent separation of said subassemblies under a tangential load.

16. The apparatus of claim 1, wherein said at least one elongated loop is arranged to provide a radially-extending gap relative to at least a portion of a lateral surface of said at least one superconducting winding and to engage said at least one superconducting winding at a distal edge of the elongated loop, thereby reducing conductive heat transfer to the superconductor winding by way of the elongated loop.

17. An apparatus comprising:
   at least one superconductor winding;
   structure to support said at least one superconductor winding in a spaced-apart relationship from a rotor core of an electromotive machine, the structure comprising:
      at least one elongated loop arranged to provide radial support to said at least one superconducting winding, the elongated loop comprising a material substantially resistant to heat flow;
      an axially-extending base assembly arranged to anchor said at least one loop with respect to the rotor core at a proximate end of the elongated loop; and a bracket assembly configured to define an interior recess to receive at least a portion of said at least one superconductor winding and to support the elongated loop at a distal end of the elongated loop, wherein the axially-extending base assembly comprises a modular assembly comprising at least one base module disposed in a cavity of the rotor core.

18. The apparatus of claim 17, wherein said rotor core cavity is configured to define mutually opposite shoulders arranged to retain the base assembly in said cavity.

19. The apparatus of claim 17, wherein said at least one base module is arranged to anchor the proximate end of said at least one loop with respect to the rotor core by way of a tubular coupling, wherein the tubular coupling is further arranged to provide an axial mechanical connection with respect to an axially-adjacent base module.

20. The apparatus of claim 19, wherein the tubular coupling comprises a segmented tubular coupling interconnectable by way of respective couplers.

21. The apparatus of claim 19, wherein the tubular coupling is arranged as a continuous tubular coupling comprising at least one axially-extending continuous rod.

22. The apparatus of claim 17, further comprising a laterally-extending loop arranged to provide lateral support to said at least one superconducting winding, the laterally-extending loop comprising a material substantially resistant to heat flow.

23. The apparatus of claim 22, wherein said lateral laterally-extending loop has a first end mechanically supported by the bracket assembly and has a second end mechanically supported by the base assembly to provide an anchor support with respect to the rotor core.

24. The apparatus of claim 22, comprising an axial sequence of side-by-side pairs of laterally-extending loops arranged to symmetrically transfer a tangential load to the rotor core.

25. The apparatus of claim 22, comprising an axial sequence of laterally-extending loops, wherein the sequence of laterally-extending loops is arranged to directionally alternate so that a first laterally-extending loop in the sequence has its first end mechanically supported by a corresponding bracket assembly at a first lateral end of said assembly, and a second axially-adjacent laterally-extending loop in the sequence has its first end mechanically supported by a corresponding bracket assembly at a second lateral end of said assembly, wherein the first and second ends of the corresponding assemblies comprise mutually opposite lateral ends, thereby said directionally alternating sequence of laterally-extending loops being arranged to symmetrically transfer a tangential load to the rotor core.

26. The apparatus of claim 25, wherein the bracket assembly comprise three subassemblies, wherein two of said three subassemblies are configured to receive respective portions of a respective pair of laterally-adjacent superconductor windings, and the third subassembly is arranged to support the respective distal ends of the elongated loops for the respective pair of laterally-adjacent superconductor windings by way of a pair of arch-shaped structures.

27. The apparatus of claim 26, further comprising a strap arranged about respective portions of an outer periphery of said three subassemblies to keep said subassemblies tightly interconnected to one another and prevent separation of said subassemblies under a tangential load.

28. The apparatus of claim 17, wherein said at least one elongated loop is arranged to provide a radially-extending gap relative to at least a portion of a lateral surface of said at least one superconducting winding and to engage said at least one superconducting winding proximate a distal edge of the elongated loop, thereby reducing conductive heat transfer to the superconductor winding by way of the elongated loop.

* * * * *